United States Patent
Sebastian et al.

(10) Patent No.: US 10,582,311 B2
(45) Date of Patent: *Mar. 3, 2020

(54) AUDIO DETECTION SYSTEM AND METHODS

(71) Applicant: DSCG SOLUTIONS, INC., Chantilly, VA (US)

(72) Inventors: Richard Sebastian, Frederick, MD (US); Kendall Belsley, Falls Church, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,883

(22) Filed: Dec. 29, 2017

(65) Prior Publication Data

US 2018/0146304 A1    May 24, 2018

Related U.S. Application Data

(63) Continuation of application No. 15/096,881, filed on Apr. 12, 2016, now Pat. No. 9,877,114.

(Continued)

(51) Int. Cl.
*H04R 1/00* (2006.01)
*H04R 3/00* (2006.01)

(Continued)

(52) U.S. Cl.
CPC ............ *H04R 23/008* (2013.01); *G10L 25/18* (2013.01); *H04R 3/005* (2013.01); *H04R 25/407* (2013.01); *H04R 27/00* (2013.01); *H04R 2499/13* (2013.01)

(58) Field of Classification Search
CPC ... G10L 25/18; H04R 23/008; H04R 2499/13; H04R 25/407; H04R 27/00; H04R 3/005; G01S 17/58

(Continued)

(56) References Cited

U.S. PATENT DOCUMENTS 4,412,105 A * 10/1983 Muscatell .............. H04R 5/027
                                                        381/172
4,479,265 A * 10/1984 Muscatell .............. H04R 27/00
                                                        359/285

(Continued)

FOREIGN PATENT DOCUMENTS

CN        1628485 A        6/2005
CN        1668939 A        9/2005

(Continued)

OTHER PUBLICATIONS

International Search Report and Written Opinion for International Application PCT/US2016/027273, dated Jul. 6, 2016, 10 pages.

(Continued)

*Primary Examiner* — Khai N. Nguyen
(74) *Attorney, Agent, or Firm* — Brake Hughes Bellermann LLP

(57) ABSTRACT

A laser microphone can include a detection system including plurality of laser subsystems. The detection system can be configured to produce emitted electromagnetic radiation based on a frequency pattern and receive reflected electromagnetic radiation reflected from an object. The detection system can be configured to define combined frequency data based on a frequency of the emitted, electromagnetic radiation and a frequency of the reflected electromagnetic radiation. The detection system can be configured to define a set of spectral bins in a frequency domain based on the combined frequency data, modify the combined frequency data based on a datapoint obtained from a subset of the set of spectral bins, and define at least one of a range or a velocity based on the combined frequency data. The laser microphone can include an audio processor configured to define an audio signal based on the at least one of the range or velocity.

16 Claims, 4 Drawing Sheets

Related U.S. Application Data

(60) Provisional application No. 62/146,736, filed on Apr. 13, 2015.

(51) Int. Cl.
*H04R 25/00* (2006.01)
*H04R 9/06* (2006.01)
*H04R 11/02* (2006.01)
*H04R 23/00* (2006.01)
*G10L 25/18* (2013.01)
*H04R 27/00* (2006.01)

(58) Field of Classification Search
USPC ... 381/92, 98, 113, 115, 168, 171, 172, 177, 381/192, 396
See application file for complete search history.

(56) References Cited

U.S. PATENT DOCUMENTS

| | | | | |
|---|---|---|---|---|
| 6,592,230 | B2* | 7/2003 | Dupay | B62D 53/10 359/838 |
| 7,307,700 | B1* | 12/2007 | Leep | G01R 23/16 356/5.01 |
| 7,927,558 | B2* | 4/2011 | Kirollos | G01N 33/0063 2/457 |
| 8,972,251 | B2* | 3/2015 | Xiang | H04K 1/02 704/200 |
| 9,336,552 | B1* | 5/2016 | Freeman | G01S 17/023 |
| 9,344,811 | B2* | 5/2016 | Bakish | A41D 13/11 |
| 9,877,114 | B2* | 1/2018 | Sebastian | H04R 23/008 |
| 2001/0022731 | A1* | 9/2001 | Dupay | B62D 53/10 362/560 |
| 2005/0217462 | A1* | 10/2005 | Thomson | G10H 1/368 84/612 |
| 2007/0058157 | A1* | 3/2007 | Deines | G01P 3/366 356/28 |
| 2007/0132630 | A1* | 6/2007 | Beckner | G01S 7/024 342/22 |
| 2007/0236704 | A1* | 10/2007 | Carr | G01L 9/0079 356/519 |
| 2007/0238490 | A1* | 10/2007 | Myrberg | H04M 1/6066 455/569.1 |
| 2009/0262760 | A1* | 10/2009 | Krupkin | G01S 7/414 372/6 |
| 2010/0158263 | A1* | 6/2010 | Katzer | G10K 11/175 381/73.1 |
| 2011/0131044 | A1* | 6/2011 | Fukuda | G10L 15/20 704/246 |
| 2011/0194711 | A1 | 8/2011 | Avenson et al. | |
| 2012/0229275 | A1* | 9/2012 | Mattern | G01S 5/18 340/540 |
| 2012/0249797 | A1* | 10/2012 | Haddick | G06F 1/163 348/158 |
| 2012/0316869 | A1* | 12/2012 | Xiang | H04K 1/02 704/226 |
| 2013/0329183 | A1* | 12/2013 | Blum | G02C 11/10 351/158 |
| 2014/0071456 | A1* | 3/2014 | Podoleanu | G01B 9/0209 356/497 |
| 2014/0119737 | A1* | 5/2014 | Bakish | H04R 23/008 398/133 |
| 2014/0226838 | A1* | 8/2014 | Wingate | G10L 21/0272 381/111 |
| 2014/0267627 | A1* | 9/2014 | Freeman | G01S 17/023 348/47 |
| 2015/0049487 | A1* | 2/2015 | Connor | F21V 33/0076 362/277 |
| 2015/0073907 | A1* | 3/2015 | Purves | G06Q 20/32 705/14.58 |
| 2015/0177367 | A1* | 6/2015 | Sebastian | G01S 7/4814 356/5.09 |
| 2015/0223002 | A1* | 8/2015 | Mehta | H04S 7/30 381/303 |
| 2015/0373477 | A1* | 12/2015 | Norris | H04M 1/72572 381/303 |
| 2016/0302010 | A1* | 10/2016 | Sebastian | H04R 23/008 |

FOREIGN PATENT DOCUMENTS

| | | |
|---|---|---|
| CN | 102138174 | 7/2011 |
| CN | 103794221 A | 5/2014 |
| JP | 6118300 A | 1/1986 |
| JP | 2018516496 A | 6/2018 |
| WO | 2014036121 A1 | 3/2014 |
| WO | 2015095739 A1 | 6/2015 |
| WO | 2016014894 | 1/2016 |
| WO | 2016168288 A1 | 10/2016 |

OTHER PUBLICATIONS

Extended European Search Report of European Application No. 16780615.7, dated Dec. 14, 2018, 14 pages.

Reibel et al., "Ultra-broadband optical chirp linearization for precision length metrology applications", 2010 Conference on Optical Fiber Communication, Collocated National Fiber Optic Engineers Conference (OFC/NFOEC), Piscataway, NJ, USA, Mar. 21, 2010, 3 pages.

First Office Action for Chinese Application No. 201680027704.5, dated Aug. 21, 2019, 20 pages.

* cited by examiner

AUDIO DETECTION SYSTEM AND METHODS

RELATED APPLICATION

This application is a Continuation of, and claims priority to, U.S. patent application Ser. No. 15/096,881, filed on Apr. 12, 2016, now U.S. Pat. No. 9,877,114, entitled "AUDIO DETECTION SYSTEM AND METHODS", which, in turn, claims priority to U.S. Provisional Application No. 62/146, 736, filed Apr. 13, 2015, entitled, "AUDIO DETECTION SYSTEM", the disclosures of which are incorporated by reference herein in their entirety.

TECHNICAL FIELD

This description relates to an audio detection system including a multiple beam laser LIght Detection And Ranging (LIDAR) system.

BACKGROUND

In some known LIDAR systems, lasers may be used to monitor audio. However, known LIDAR systems used in audio monitoring are often relatively slow, inefficient, and/or inaccurate. Thus, a need exists for systems, methods, and apparatus to address the shortfalls of present technology and to provide other new and innovative features.

SUMMARY

In one general aspect, a laser microphone can include a detection system including plurality of laser subsystems. The detection system can be configured to produce emitted electromagnetic radiation based on a frequency pattern and receive reflected electromagnetic radiation reflected from an object. The detection system can be configured to define combined frequency data based on a frequency of the emitted, electromagnetic radiation and a frequency of the reflected electromagnetic radiation. The detection system can be configured to define a set of spectral bins in a frequency domain based on the combined frequency data, modify the combined frequency data based on a datapoint obtained from a subset of the set of spectral bins, and define at least one of a range or a velocity based on the combined frequency data. The laser microphone can include an audio processor configured to define an audio signal based on the at least one of the range or the velocity.

In another general aspect, an audio system can include a detection system including a laser configured to produce emitted electromagnetic radiation based on a frequency pattern, a receiver configured to receive reflected electromagnetic radiation reflected from an object, and an analyzer configured to define combined frequency data based on a frequency of the emitted electromagnetic radiation and a frequency of the reflected electromagnetic radiation. The analyzer can be configured to iteratively perform spectral analysis on the combined frequency data until a beat frequency is determined based on a threshold condition. The audio system can include an audio processor configured to define an audio signal based on the beat frequency.

In yet another general aspect, a method can include defining combined frequency data based on a frequency of electromagnetic radiation emitted toward an object from a laser and a frequency of electromagnetic radiation reflected from the object and defining a set of spectral bins based on the combined frequency data. The method can include identifying a subset of the set of spectral bins and producing time series data based on the subset of the set of spectral bins. The method can also include defining phase angle data based on the time series data and modifying the combined frequency data based on the phase angle data. The method can also include defining an audio signal based on the combined frequency data.

DETAILED DESCRIPTION

Figure 1:
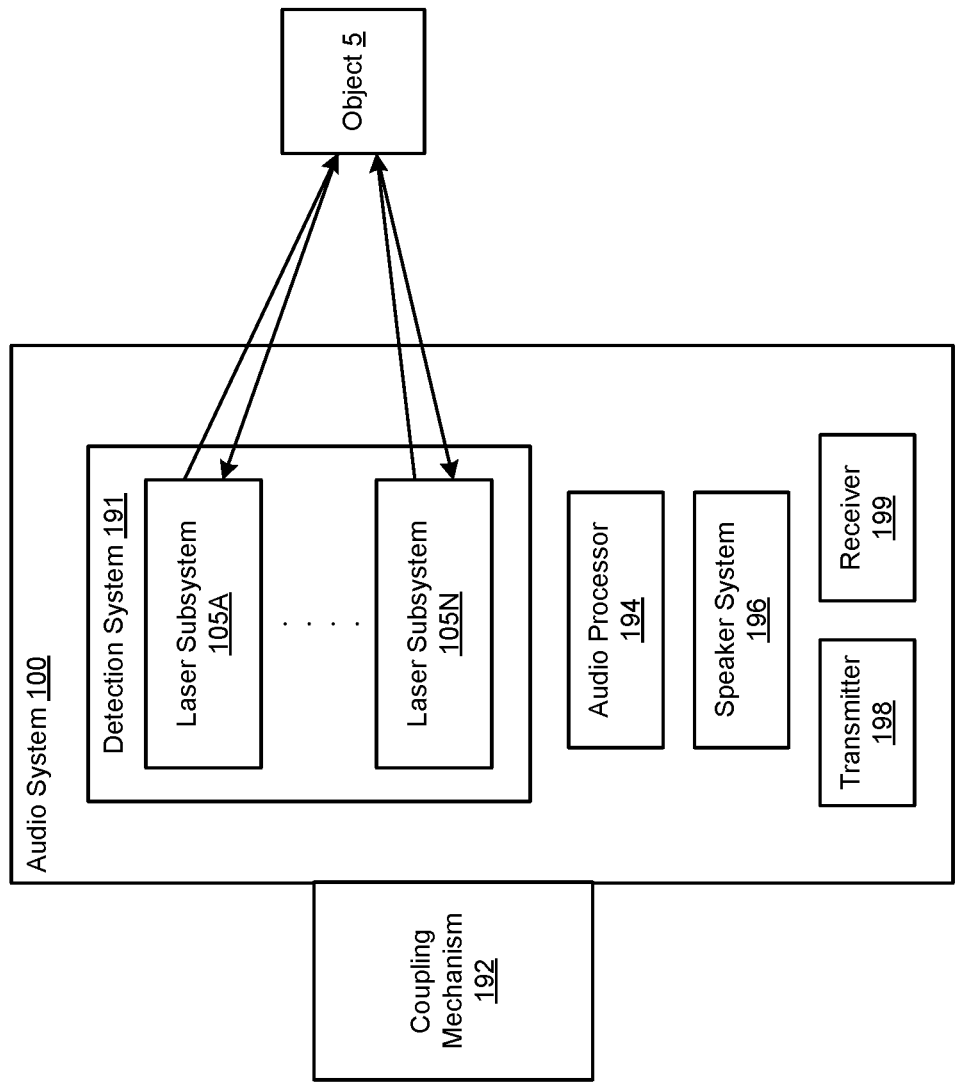
FIG. 1 is a diagram that illustrates an audio system including multiple laser subsystems.

FIG. 1 is a diagram that illustrates an audio system 100 configured to use multiple laser subsystems 105A through 105N (also can be referred to as a LIght Detection And Ranging (LIDAR) subsystems) to detect audio produced by an object 5 (e.g., a person, a vehicle, a machine) that can be stationary or moving with respect to the audio system 100. The laser subsystems 105A through 105N are included in a detection system 191. Accordingly, the audio system 100 can be configured to produce an array of lasers for, for example, audio monitoring of the object 5. In some implementations, the object 5 can be referred to as a target or as a target object 5. The audio system 100 can be used in frequency modulated continuous wave (FMCW) audio detection applications. In some implementations, audio detection can include audio monitoring.

The audio system 100 can implement a multiple beam range detection process that can, for example, improve the speed and accuracy of audio detection. As a specific example, a single settling time for the simultaneous use of multiple lasers from the audio system 100 can result in measurement efficiencies over a system with a single laser used multiple times where each use of the single laser is associated with a settling time resulting in multiple settling times. The audio system 100 can also be configured to account for various issues related to vibrations of the object 5 that can result in inaccuracies in audio detection.

Figure 2A:
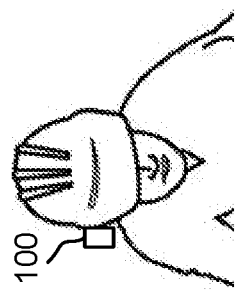
FIGS. 2A through 2C are diagrams that illustrates the audio system in various applications.
Figure 2C:
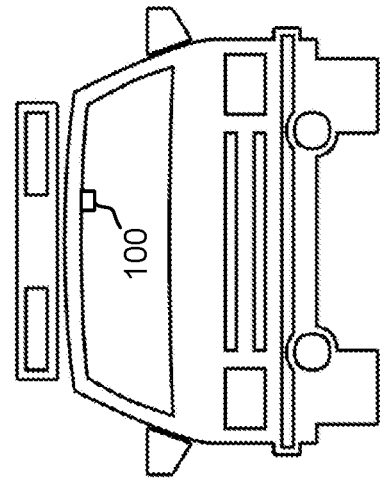
Figure 2B:
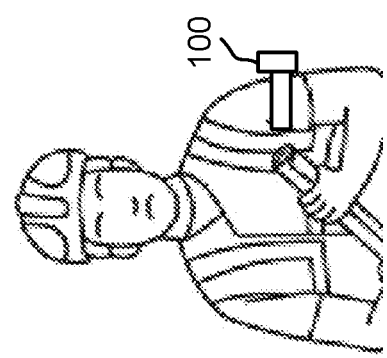

The audio system 100 can be, or can be used within a variety of devices. For example, FIGS. 2A and 2B are diagrams that illustrate the audio system 100 (or a device that includes the audio system) coupled to a person as a wearable device in a helmet (FIG. 2A) and in an armband (FIG. 2B). FIG. 2C is a diagram that illustrates the audio system 100 (or a device that includes the audio system) within a vehicle. More details related to various applications are described below.

In some implementations, the audio system 100 can be used in, for example, a miniature laser microphone array for contactless voice pickup directly from the object 5 (e.g., a subject head or neck) providing blind source separation from, for example, other speakers and noise (e.g., surrounding noise). In some implementations, the audio system 100 can be a laser microphone mounted in an automotive environment to collect and/or enhance intelligibility of audio commands, phone calls, and/or so forth for improved conversations, speaker recognition, and/or speech recognition.

In some implementations, the audio system 100 can be a laser microphone mounted within a vehicle, such as on a mirror (e.g., rearview mirror) of the vehicle. In some implementations, the microphone portion can be a 1-way or a unidirectional microphone portion. In some implementations, markings (e.g., a hash marking, a reticle) on the mirror can be used for desirable positioning of the laser microphone relative to, for example, an occupant (e.g., a driver head location) of the vehicle.

In some implementations, the audio system 100 can be mounted on a wearable device (hat, glasses, etc.) of a user, which can function as, for example, a hearing aid to enhance intelligibility of conversations (e.g., close conversations (e.g., within a few feet)) in, for example, a relatively noisy environment. In some implementations, the audio system 100 can be coupled to a wearable device that can be used in conjunction with audio and/or visual feedback on, for example, a device such as a smartphone or tablet as a diagnostic tool for, for example, mechanical applications (e.g., automobile applications, manufacturing applications). In some implementations, a helmet (which can be a type of a wearable device) of a person (e.g., a first responder (e.g., a fire response, emergency medical services (EMS), etc.), a military person (e.g., a soldiers, an operator, etc.), a racecar driver, an aircraft person (e.g., a pilot, a ground crew person, a maintenance person), a marine (e.g., a civilian, a coast guard person), a construction person, etc.). The audio system 100 can be used to collect and enhance intelligibility of audio commands and/or phone calls.

In some implementations, the audio system 100 can be a laser microphone mounted within an earpiece and/or other body-worn (or wearable) device to enhance intelligibility in noisy environments and/or to provide the ability to speak without being overheard as in a contactless stenomask application.

In some implementations, the audio system 100 can be included in a miniature laser microphone array for contactless voice pickup directly from an object (e.g., a subject head or neck) providing for public address (PA) systems to eliminate or reduce, for example, audio feedback. The audio system 100 can be aimed at multiple audio sources in, for example, a studio situation to isolate vocals, individual instruments, and/or so forth to completely separate acoustic signatures during, for example, simultaneous playback.

In some implementations, the audio system 100 can be used as, or included in, a remote, motion-insensitive laser microphone for identification and/or discrimination of, for example, different types of vehicles. In some implementations, the audio system 100 can be used as, or included in, a remote, motion-insensitive laser microphone for identification of individuals (remote biometric voiceprint apparatus).

In some implementations, the audio system 100 can be used as, or included in, a remote, motion-insensitive laser microphone for detection (e.g., pick-up) of, for example, questions and/or comments from an audience member, classroom participant, and/or so forth, in a room (e.g., an auditorium). In some implementations, the audio system 100 can be used as, or included in, a remote, motion-insensitive laser microphone for detection (e.g., pick-up) of, for example, audio from members of a crowd or assembly. Both can be performed with, for example, blind-source separation.

In some implementations, the audio system 100 can be, or can include, a remote, motion-insensitive laser microphone for background noise elimination in a call-center environment.

In some implementations, the audio system 100 can be, or can include, a closely-spaced cluster of LIDAR beams configured for object or feature tracking. The specific tracking applications can include an edge detector for mobile phone lock-on tracking, an edge detector for face tracking, using, for example, one or more of the following methods including range continuity, velocity continuity, signal-to-noise ratio (SNR) continuity, return power continuity, three-dimensional (3D) surface curvature, and/or so forth.

Although FIG. 1 illustrates an audio system 100 including multiple laser subsystems 105A through 105N within the detection system 191. In some implementations, the audio system 100 can include a single laser system or subsystem. One example method for analysis of laser signals in a single laser system is described in connection with at least FIG. 4.

Frequencies derived from simultaneous, or temporally close, up and down chirps may be used to separate, or independently determine, the frequency components due to subject range and velocity. These separate measures of range and velocity may be used, severally or jointly, to produce an audio signal based on the motion (e.g., vibrations) of the surface that reflects laser beam(s). For example, range and/or velocity can be correlated with vibrations (e.g., oscillations) that can be produced as (e.g., converted into) audio (e.g., an audio signal). The audio processor 194 can be configured to produce the audio based on the range and/or the velocity produced by the detection system 191.

As shown in FIG. 1, in some implementations, the audio system 100 can include a speaker system 196 that can be used to produce audio in response to an audio signal produced by the audio processor 194. Also, the audio system 100 can include, in some implementations, a transmitter 198 configured to transmit and/or a receiver 199 configured to receive an audio signal.

Also, as shown in FIG. 1, the audio system 100 can include a coupling mechanism 192. The coupling mechanism 192 can be used to couple the audio system 100 to an object (e.g., another device), a person, etc.

Figure 3:
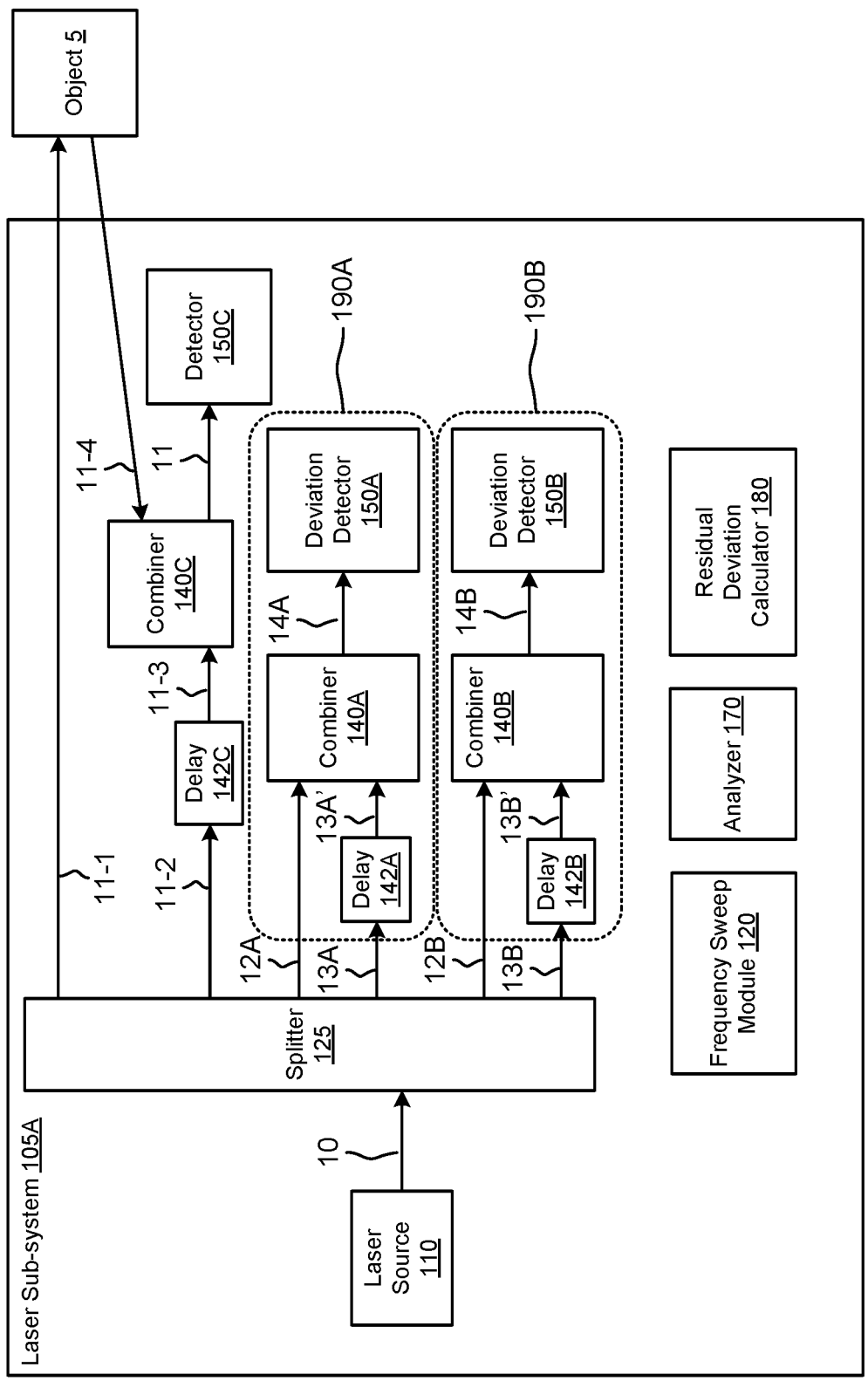
FIG. 3 is a diagram that illustrates, in more detail, example components included in at least one of the laser subsystems shown in FIG. 1.

FIG. 3 is a diagram that illustrates, in more detail, example components included in at least one of the laser subsystems 105A shown in FIG. 1. The laser subsystem 105A is configured to emit (e.g., produce, propagate) electromagnetic radiation at one or more frequencies that can be, for example, a coherent light emission (e.g., monochromatic light emission) or beam. For simplicity, the emissions from the laser source 110 will be referred to as an electromagnetic radiation emission (such as electromagnetic radiation emission), an emitted laser signal 10, or as an emitted light.

As shown in FIG. 3, the laser signal 10 can be split by the splitter 125 into multiple laser signals such as at least laser signals 11-1, 11-2, 12A, 12B, 13A, and 13B. The laser signals 12A, 12B, 13A, and 13B can be produced by the splitter 125 for processing by, for example, reference systems 190A, 190B, which each include an interferometer (which can include one or more photodetectors or detectors (e.g., detector 150C) configured to convert an optical signal into an electrical signal). In some implementations, the laser signal 11 can be derived from a split laser signal and can be referred to as combined laser signal. As shown in FIG. 3, an interferometer can be used to produce the laser signal 11, which may be analyzed for one or more corrections by an analyzer 170 (which can also be referred to as a demodulator). In such implementations, the laser signal 10 can be further split (e.g., by splitter 125) into laser signal 11-1 and laser signal 11-2. The laser signal 11-1 can be reflected from an object 5 as laser signal 11-4. Laser signal 11-2 can be delayed by a delay 142C (which can be correlated to a length) to laser signal 11-3 and laser signal 11-3 can be combined with the laser signal 11-4 via a combiner 140C. The laser signal 11 (also can be referred to as an interferometer signal) from the interferometer can be used to gather information about the laser signal 11 using a detector 150C. Discussions related to laser signal 11 below can be applied to any of the component laser signals 11-1 through 11-4 that can be used to define laser signal 11, which can be the target laser signal or the laser signal targeted for analysis by the analyzer 170. The splitter 125 is illustrated as a single component for simplicity. In some implementations, the splitter 125 can include more than one splitter. Similarly one or more of the combiners shown in FIG. 3 may be combined or may include additional combiners.

As shown in FIG. 3, the laser subsystem 105A includes a frequency sweep module 120. The frequency sweep module 120 is configured to trigger the laser source 110 to produce a variety of optical frequencies (also can be referred to generally as frequencies), for example, by modulating a drive current of the laser source 110. Specifically, the frequency sweep module 120 is configured to trigger laser source 110 to produce a pattern of optical frequencies (also can be referred to as a frequency pattern). For example, the frequency sweep module 120 can be configured to trigger the laser source 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern can have a cycle including an up-chirp and a down-chirp.

The laser subsystem 105A includes a combiner 140C configured to receive the laser signal 11-4 reflected (also can be referred to as a reflected laser signal or as a scattered laser signal) (not shown) from the object 5 in response to an emitted laser signal 11-1 (split from laser signal 10) from the laser source 110 toward the object 5. In some implementations, the reflected laser signal (also can be referred to as a return signal or return light) from the object 5 can be mixed with a portion of the emitted laser signal 10 (e.g., laser signal 11-3 delayed by delay 142C) and then analyzed by the analyzer 170 (after being converted to an electrical signal by detector 150C).

The analyzer 170 of the laser subsystem 105A is configured to analyze a combination of emitted laser signal 11-1 from the laser source 110 and reflected laser signal 11-4 received by the combiner 140C. The emitted laser signal 11-1 can be emitted in accordance with a pattern including an up-chirp followed by a down-chirp (or a down-chirp followed by an up-chirp). The combination of a frequency of the emitted laser signal 11-1 from the laser source 110 and a frequency of the reflected laser signal 11-4 received by the combiner 140C can be analyzed by the analyzer 170 to obtain or define a beat frequency or signal. In other words, the beat frequency can be a sum of a signal frequency change over the round trip to the object 5 (emitted laser signal) and back (reflected laser signal), and may include a Doppler frequency shift of the reflected laser signal resulting from relative range motion between the laser subsystem 105A and the object 5. In some implementations, the beat signal can have a relatively constant frequency or a varying frequency. In some implementations, a combination of a frequency of emitted laser signal 11-1 and a frequency of reflected laser signal 11-4 can be referred to as a difference frequency, a beat frequency or as a round-trip frequency.

Frequencies derived from simultaneous, or temporally close, up and down chirps may be used to separate, or independently determine, the frequency components due to subject range and velocity. These separate measures of range and velocity may be used, severally or jointly, to produce an audio signal based on the motion of the surface that reflects laser beam(s). In other words, range and/or velocity can be correlated with vibrations (e.g., oscillations) that can be produced as (e.g., converted into) audio (e.g., an audio signal). The audio processor 194 can be configured to produce the audio based on the range and/or the velocity (which changes over time as vibrations) produced by the detection system 191.

The analyzer 170 can be configured to calculate a round-trip time period, which is a time period from the emission of the laser signal 10 to receipt of the return of the reflected laser signal. A combination of the emitted later signal 11-1 and the reflected laser signal 11-4 can collectively be referred to as a round-trip laser signal. The analyzer 170 can also be configured to calculate a range and/or a velocity based on the combination of the emitted laser signal 11-1 and the reflected laser signal 11-4.

The optical power of the laser output can change significantly during a frequency pattern such as a frequency sweep or up-chirp/down-chirp as a result of, for example, drive current modulation of the laser source 110. The frequency pattern may be non-ideal (e.g., may deviate) from a specified frequency pattern because of an imperfect drive current signal, unavoidable thermal excitations in the laser source 110, and/or so forth that can cause variations, for example, frequency, phase, and/or so forth.

The laser subsystem 105A includes reference systems 190A, 190B configured to produce reference signals that can be used to correct for, for example, frequency deviations, phase deviations, etc. in one or more laser signals produced by the laser source 110. In other words, the reference systems 190A, 190B included in the laser subsystem 105A can be configured to facilitate compensation for deviations (e.g., non-linearities, non-idealities, errors) in a frequency pattern of, for example, the emitted laser signal 11-1, a reflected laser signal 11-4, a round-trip laser signal, and/or so forth, from the laser subsystem 105A. The reference systems 190A, 190B can be used to achieve a near ideal, or ideal, FMCW LIDAR implementation. Specifically, the reference systems 190A, 190B can be used to correct for deviations to obtain a relatively constant beat frequency. Laser signals that are targeted for correction (e.g., adjustment) by the reference systems 190A, 190B can be referred to as target laser signals and can include at least the emitted laser signal 10 (or a signal derived therefrom), a reflected laser signal (or a signal derived therefrom), and a round-trip laser signal (or a signal derived therefrom).

Each of the reference systems 190A, 190B is configured to define, respectively, a reference signal 14A, 14B that can be used to determine (e.g., identify, calculate) deviations in one or more target laser signals (e.g., laser signal 11). The laser signal 10 can be split by the splitter 125 into laser signal 12A, 12B for processing by the reference systems 190A, 190B. The reference signal 14A can be produced based on a combination (using combiner 140A) of the laser signal 12A and a delayed laser signal 13A' produced based on the laser signal 13A. Similarly, the reference signal 14B can be produced based on a combination (using combiner 140B) of the laser signal 12B and a delayed laser signal 13B' produced based on the laser signal 13B. In other words, the reference signals 14A, 14B can be beat signals produced respectively, by the combination of the laser signal 12A and the delayed signal 13A' and by the combination of the laser signal 12B and the delayed signal 13B'. The delayed signals 13A', 13B' are produced through delays 142A, 142B, respectively. The delays 142A, 142B can each be referred to as a fixed delay or reference arm lengths, and the reference signals 14A, 14B can be referred to as reference arm signals. Each of the delays 142A, 142B can be configured to define a delay time period, and can be part of (e.g., included in) an interferometer.

The deviation detectors 150A, 150B can be configured to determine deviations associated with the reference signals 14A, 14B, respectively. In some implementations, the deviation detectors 150A, 150B can be combined into a single module or divided into multiple modules. In some implementations, one or more of the deviation detectors 150A, 150B can be configured to detect a variety of deviations including phase shifts, and so forth. One or more of the deviation detectors 150A, 150B can include, or can be, a photodetector.

Because the analyzer 170 may not be configured to directly measure deviations of the one or more target laser signals, the reference systems 190A, 190B can be configured to measure deviations (e.g., using the deviation detectors 150A, 150B) of time segments of the reference signals 14A, 14B that can correspond with time segments of the one or more target laser signals (e.g., laser signal 11). In some implementations, a time signal associated with a target laser signal can be referred to as a target time segment. For example, the reference systems 190A, 190B can be configured to measure laser phase time history of time segments of the reference signals 14A, 14B that correspond with time segments of one or more target laser signals. In general, the phase time history of the Hilbert transform of the reference signals 14A, 14B can be used to correct the deviations of the phase time history of one or more target laser signals so that the corrected target laser signal(s) can be a desirable tone from which a desirable frequency determination may be made.

In this implementation, multiple reference systems—reference systems 190A, 190B—are used to measure deviations of different time segments. Specifically, the delay 142A can be different from the delay 142B, so that the reference signals 14A and 14B will be associated with different time segments (or delay time periods). Accordingly, deviations associated with each of the different time segments can be used in a variety of mathematical combinations to determine (e.g., calculate) in a relatively accurate fashion a deviation of yet another time segment of one or more target signals. The multiple reference system included in the laser subsystem 105A has many advantages over a single reference signal processing system or method because a single reference signal processing system may, for example, make assumptions about phase history to estimate laser phase time history.

In some implementations, the time segments associated with the reference systems 190A, 190B can correspond with a sampling rate of the analyzer 170. In some implementations, the time segments can correspond with integer multiples (also can be referred to as integral numbers) of sampling intervals or sampling time periods. For example, the sampling rate of the analyzer 170 can include a sampling time period of a few nanoseconds. The delay 142A can be defined to correspond with an integer multiple of the sampling time period (e.g., 5 integer multiples×5 ns sampling time period=25 ns delay) such that a deviation associated with the reference signal 14A can be associated with a time segment that corresponds with the integer multiple of the sampling time period. By doing so the deviations associated with time segments of the reference signals 14A, 14B can be matched to time segments of sampling time periods associated with one or more target signals. Accordingly, the deviation of a time segment of a target laser signal can be accurately determined.

In some implementations, the delays associated with the reference systems 190A, 190B can have a difference based on one or more sampling time periods. Specifically, the delay 142A and the delay 142B can be separated by an integer multiple of a sampling time period (e.g., sampling interval).

In some implementations, one or more of the delays 142A, 142B can have a delay time period that is a prime number of sampling time periods. In some implementations, the delays 142A, 142B can be defined with delay time periods that do not have a common factor.

In some implementations, with a non-zero deviation (e.g., phase measurement deviation), the longer of delay time periods of the two reference systems 190A, 190B may a have delay based on the ratio (range (distance)–LO (length))/(long reference arm length). The range is the round trip delay to the object 5, and the LO length is a length correlated to the delay 142C. The (range–LO) term can represent a length difference associated with an interferometer signal derived from the laser signal 10. In other words, the range term can be a length associated with the laser signal 10 that may include the distance to a target (e.g., object 5), and may be a round-trip distance, and the LO term can be a length associated with a delayed version of the laser signal 10. Accordingly, the (range–LO) can represent a length derived from a beating of the laser signal 10 and a delayed version of the laser signal 10. In some implementations, the ratio can be, or should be, less than 10. The two references can be used to effectively concatenate, for example, deviation difference (e.g., phase difference) measurements for relatively short time periods to obtain phase difference estimates for relatively long time periods. In some implementations, fewer short time measurements concatenated together may be desirable for an accurate long range measurement.

Also, in some implementations, the shorter of the delay time periods associated with the two reference systems 190A, 190B may be short enough that a relatively short time delay period deviation may be estimated accurately, and a relatively small number of measurements may be used to estimate the deviation of a given (range–LO) length. Of the reference systems 190A, 190B with the shorter delay (or length), the shorter delay (e.g., delay 142A, delay 142B) may be large enough that the root mean square (RMS) phase measurement error (e.g., error due to noise) of, for example, laser signal 14B is small compared to the measured RMS phase deviation due to imperfections in the laser source 110.

In some implementations, the deviation detectors 150A, 150B can be configured to determine (e.g., calculate, measure) deviations for time segments that correspond with the sampling time periods. In other words, deviations can be measured for time segments starting at more than one sampling time period. Accordingly, deviations can be measured for time segments of a target laser signal having a variety of durations and starting at different times (e.g., sampling times).

In some implementations, deviations for a segment of a target laser signal can be determined based on deviations associated with multiple segments (e.g., concatenated segments, overlapping segments) measured using a single reference system. For example, a deviation detector can be configured to measure a first deviation associated with a first time segment starting at a first time using a reference system having a delay. The deviation detector can be configured to measure a second deviation associated with a second time segment starting at a second time, different from the first time period, using the same reference system having the same delay. In some implementations, the first time segment can be mutually exclusive with the second time segment. In some implementations, the first time segment can have overlap with the second time segment. The overlap in the segments can occur, in particular, when measuring a residual deviation.

In some implementations, an overall deviation associated with a time segment of a target laser signal can be determined based on a deviation detected using only one of the reference systems 190A, 190B. For example, two or more deviations associated with two or more time segments associated with the reference signal 14A of the reference system 190A can be used in combination to determine an overall deviation associated with a time segment of the target laser signal.

In some implementations, time segments associated with the reference systems 190A, 190B may not be matched in a desirable fashion with a time segment of a target laser system. In such instances, a residual deviation calculator 180 included in the laser subsystem 105A shown in FIG. 3 can be configured to calculate, using a variety of methods (e.g., an average, a truncated portion), a residual deviation based on one or more of the time segments associated with the reference systems 190A, 190B.

Using properly constructed reference arms (e.g., reference systems 190A, 190B shown in FIG. 3), within reference arm phase measurement deviation, the (range–LO) delay phase time history may be estimated accurately (e.g., perfectly), to the nearest sample length. The deviation in subsample phase estimation will, in general, be relatively small because one sample period is small compared with 1/(laser line width) and laser changes within that period should be small.

Figure 4:
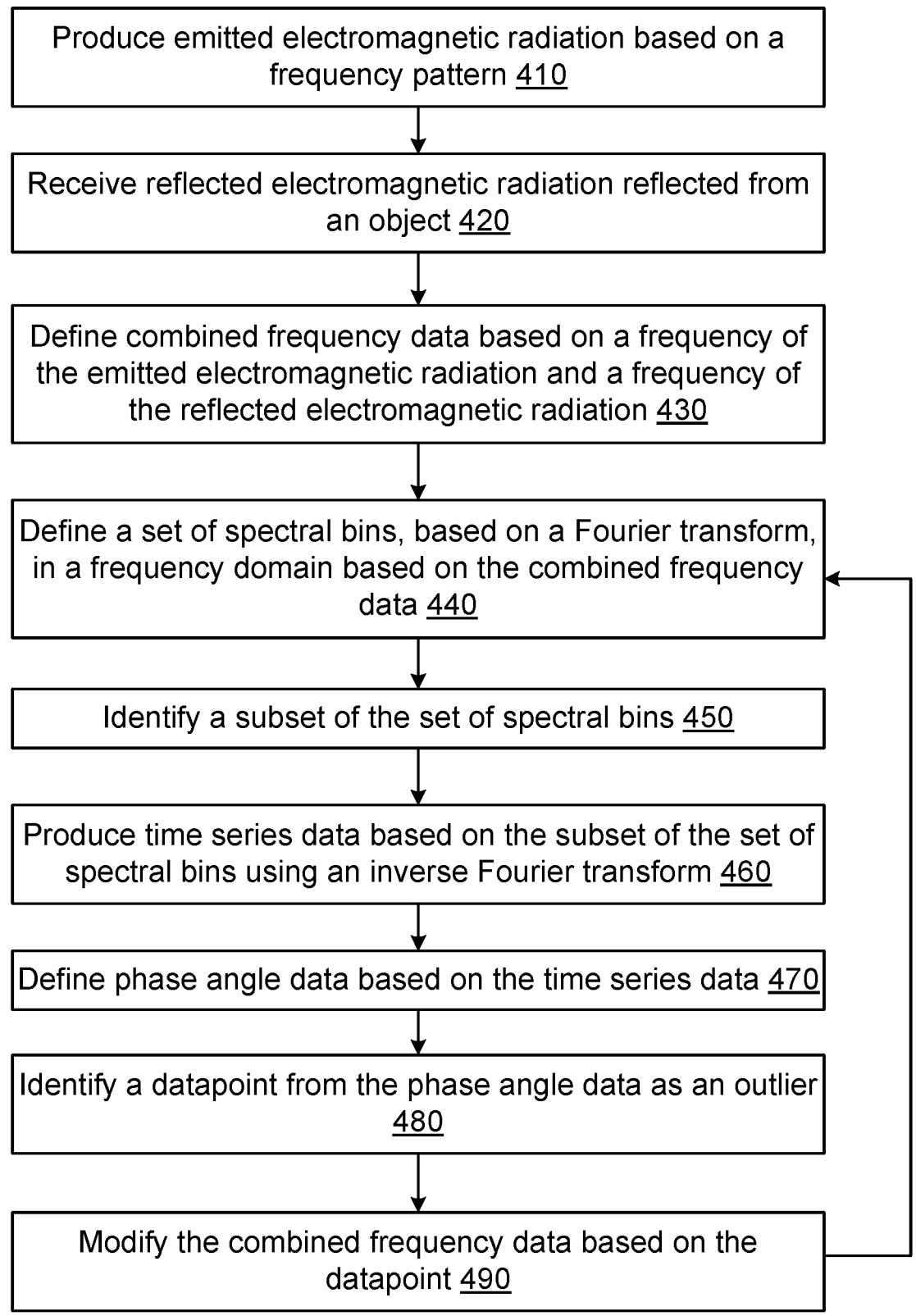
FIG. 4 is a flowchart that illustrates a spectral analysis method for use in an audio system including a single laser system.

FIG. 4 is a flowchart that illustrates a spectral analysis method (also can be referred to as a process) for implementation in a single-laser LIDAR system. The analysis can be performed, least in part, by an analyzer (e.g., analyzer 170 shown in FIG. 1B). As described herein, the spectral analysis methods (e.g., linear predictive method) and associated apparatus (e.g., audio system 100) can be configured to remove systematic differences between, for example, consecutive up-chirps and down-chirps within a frequency pattern that can degrade the separation of velocity and range. The spectral analysis and methods and apparatus described herein can be advantageous over simultaneous counter-chirp methods using multi-laser LIDAR systems.

In some implementations, the spectral analysis method described below can be performed on portions of combined frequency data. In some implementations, the spectral analysis method can be performed in hardware (e.g., in an FPGA, in a DSP). In some implementations, one or more of the portions of the spectral analysis method can be performed in a hardware pipeline. In some implementations, one or more portions of the spectral analysis method can be performed iteratively. In some implementations, an order of the portions of the spectral analysis method can be different than that shown and described below.

As shown in FIG. 4, emitted electromagnetic radiation is produced based on a frequency pattern (block 410). The emitted electromagnetic radiation can be produced by a laser such as laser source 110 shown in FIG. 1. The frequency pattern can be, or can include, for example, a frequency sweep including an up-chirp and a down-chirp.

Reflected electromagnetic radiation that is reflected from an object is received (block 420). Combined frequency data is defined based on a frequency of the emitted electromagnetic radiation and a frequency of the reflected electromagnetic radiation (block 430).

A set of spectral bins is defined, based on a Fourier transform, in a frequency domain based on the combined frequency data (block 440). The Fourier transform can be performed by a Fourier transform module (not shown). One or more of the bins from the set of spectral bins can be defined based on peaks (e.g., power density peaks) associated with the bins.

In some implementations, the detection system 191 can be configured to define a set of spectral bins in a frequency domain based on the combined frequency data, modify the combined frequency data based on a datapoint obtained from a subset of the set of spectral bins, and define at least one of a range or a velocity based on the combined frequency data. The audio processor 194 of the audio system 100 can be configured to define an audio signal based on the at least one of the range or the velocity. The audio processor 194 of the audio system 100 can be configured to define an audio signal based on the beat frequency. The method can also include defining an audio signal based on the combined frequency data.

At least a subset of the set of spectral bins is identified (block 450). In some implementations, the subset of the set of spectral bins (if a subset is identified) can be identified by a segment module (not shown). In some implementations, the subset can be defined based on one or more criteria.

Time series data is produced based on the subset of the set of spectral bins using an inverse Fourier transform (block 460). The inverse Fourier transform can be performed by an inverse Fourier transform module (not shown).

Phase angle data is defined based on the time series data (block 470). In some implementations, the phase angle data can be defined using a phase angle module (not shown). In some implementations, the phase angle data can be related to the subset of the set of spectral bins if a subset is selected and identified.

A datapoint from the phase angle data is identified as an outlier (block 480). In some implementations, the datapoint can be identified using an outlier analyzer (not shown). In some implementations, the datapoint can be identified using one or more statistical algorithms, models, or procedures.

The combined frequency data is modified based on the datapoint (block 490). In some implementations, a portion of the combined frequency data can be eliminated (e.g., excluded, discarded) for further analysis based on the datapoint. In some implementations, the combined frequency data can be modified using a segment module (not shown).

As shown in FIG. 4, portions of the spectral analysis method can be iteratively performed as represented by the arrow from block 490 to block 440. In this example, after the modification of the combined frequency data (block 490), the modified combined frequency data can be processed at block 440. In some implementations, a subset of portions of the spectral analysis method (which can be different than the subset shown in FIG. 4) can be iteratively performed.

Although not illustrated in FIG. 4, in some implementations, one or more portions of the combined frequency data can be segmented before processing is performed using at least a portion of the blocks 440 through 490. In some implementations, after being segmented, a subset of the portions may be processed using at least a portion of the blocks 440 through 490. In some implementations, such segmenting can be performed by a segment module (not shown).

In some implementations, one or more portions of the components shown in, for example, the audio system 100 and/or the laser subsystem 105A in FIGS. 1 and 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the laser subsystem 105A can be, or can include, a software module configured for execution by at least one processor (not shown). In some implementations, the functionality of the components can be included in different modules and/or different components than those shown in FIGS. 1 and 3.

In some embodiments, one or more of the components of the laser subsystem 105A can be, or can include, processors configured to process instructions stored in a memory. For example, the analyzer 170 (and/or a portion thereof) can be a combination of a processor and a memory configured to execute instructions related to a process to implement one or more functions.

Although not shown, in some implementations, the components of the laser subsystem 105A (or portions thereof) can be configured to operate within, for example, a data center (e.g., a cloud computing environment), a computer system, one or more server/host devices, and/or so forth. In some implementations, the components of the laser subsystem 105A (or portions thereof) can be configured to operate within a network. Thus, the laser subsystem 105A (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the laser subsystem 105A.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A laser microphone system, comprising:
    a detection system including plurality of laser subsystems, each of the plurality of laser subsystems configured to:
        produce emitted electromagnetic radiation based on a frequency pattern,
        receive reflected electromagnetic radiation reflected from a first object,
        define combined frequency data based on a frequency of the emitted, electromagnetic radiation and a frequency of the reflected electromagnetic radiation, and
        define at least one of a range or a velocity based on the combined frequency data;
    an audio processor configured to define an audio signal based on the at least one of the range or the velocity of at least one of the plurality of laser subsystems; and
    a coupling device configured to couple the plurality of laser subsystems and the audio processor to a second object, the second object being distinct from the first object.

2. The laser microphone system of claim 1, wherein the second object includes a wearable device worn by a user.

3. The laser microphone system of claim 2, wherein the wearable device includes a helmet.

4. The laser microphone system of claim 2, wherein the wearable device includes an armband.

5. The laser microphone system of claim 2, wherein the wearable device includes a hearing aid.

6. The laser microphone system of claim 2, further comprising:
    an electronic device coupled to the wearable device, the electronic device including an output device configured to communicate diagnostic feedback to the user, the diagnostic feedback indicating a level of intelligibility of the audio signal defined by the audio processor.

7. The laser microphone system of claim 2, wherein the electronic device includes a display for visual communication with the user.

8. The laser microphone system of claim 2, wherein the wearable device includes an earpiece, and
    wherein the plurality of laser subsystems and the audio processor form a laser microphone mounted within the earpiece.

9. The laser microphone system of claim 1, wherein the second object includes a vehicle.

10. The laser microphone system of claim 9, wherein the coupling device includes a mount configured to attach the plurality of laser subsystems and the audio processor onto the second object, the second object being fixed with respect to the vehicle.

11. The laser microphone system of claim 10, wherein the second object includes a rearview mirror.

12. The laser microphone system of claim 10, wherein the plurality of laser subsystems and the audio processor are attached to the mount at a position determined according to a plurality of markings on the mount.

13. The laser microphone system of claim 9, wherein the plurality of laser subsystems and the audio processor form a laser microphone mounted within the vehicle.

14. A miniature laser microphone array including the laser microphone system of claim 1.

15. A laser microphone system, comprising:
    a plurality of laser subsystems configured to estimate at least one of a range and a velocity of a first object;
    an audio processor configured to define an audio signal based on the at least one of the range or the velocity of at least one of the plurality of laser subsystems; and
    a coupling device configured to couple the plurality of laser subsystems and the audio processor to a second object, the second object being distinct from the first object.

16. The laser microphone system of claim 15, wherein the laser microphone includes a unidirectional microphone.

* * * * *